United States Patent
Bolinth et al.

(10) Patent No.: US 8,428,537 B2
(45) Date of Patent: Apr. 23, 2013

(54) RECEIVER HAVING ADJUSTABLE CHANNEL ESTIMATION BANDWIDTH

(75) Inventors: Edgar Bolinth, Korschenbroich (DE); Herbert Dawid, Aachen (DE); Thorsten Clevorn, Duesseldorf (DE)

(73) Assignee: Intel Mobile Communications GmbH, Neubiberg (DE)

( * ) Notice: Subject to any disclaimer, the term of this patent is extended or adjusted under 35 U.S.C. 154(b) by 336 days.

(21) Appl. No.: 12/787,561

(22) Filed: May 26, 2010

(65) Prior Publication Data

US 2011/0294451 A1    Dec. 1, 2011

(51) Int. Cl.
*H04B 1/06* (2006.01)
*H04B 7/00* (2006.01)

(52) U.S. Cl.
USPC .................. 455/266; 455/306; 455/339

(58) Field of Classification Search ............. 455/286, 455/306, 307, 334, 339, 266
See application file for complete search history.

(56) References Cited

U.S. PATENT DOCUMENTS

2003/0108127 A1* 6/2003 Eilts et al. .............. 375/340
2005/0105647 A1* 5/2005 Wilhelmsson et al. ..... 375/316

OTHER PUBLICATIONS

David R. Pauluzzi, et al., "A Comparison of SNR Estimation Techniques for the AWGN Channel", IEEE Transactions on Communications, vol. 48, No. 10, Oct. 2000, pp. 1681-1691.
3 GPP TS 25.101 V8.0.0, Sep. 2007, Annex B.2.5, pp. 143-144.

* cited by examiner

*Primary Examiner* — Christian Hannon
(74) *Attorney, Agent, or Firm* — Eschweiler & Associates, LLC

(57) ABSTRACT

A receiver includes an input to receive data of a pilot channel having a carrier frequency associated therewith, and a first unit to obtain a quantity, wherein the quantity depends on a frequency broadening of the received data and a frequency shift of the received data with respect to the carrier frequency. The receiver also includes a second unit to adjust the bandwidth of a channel estimation unit, wherein the adjustment depends on the quantity.

24 Claims, 12 Drawing Sheets

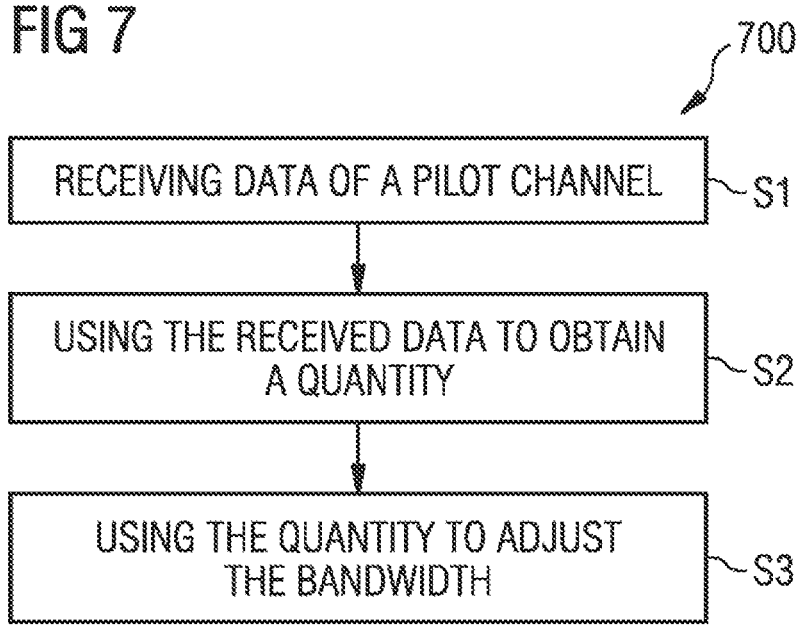
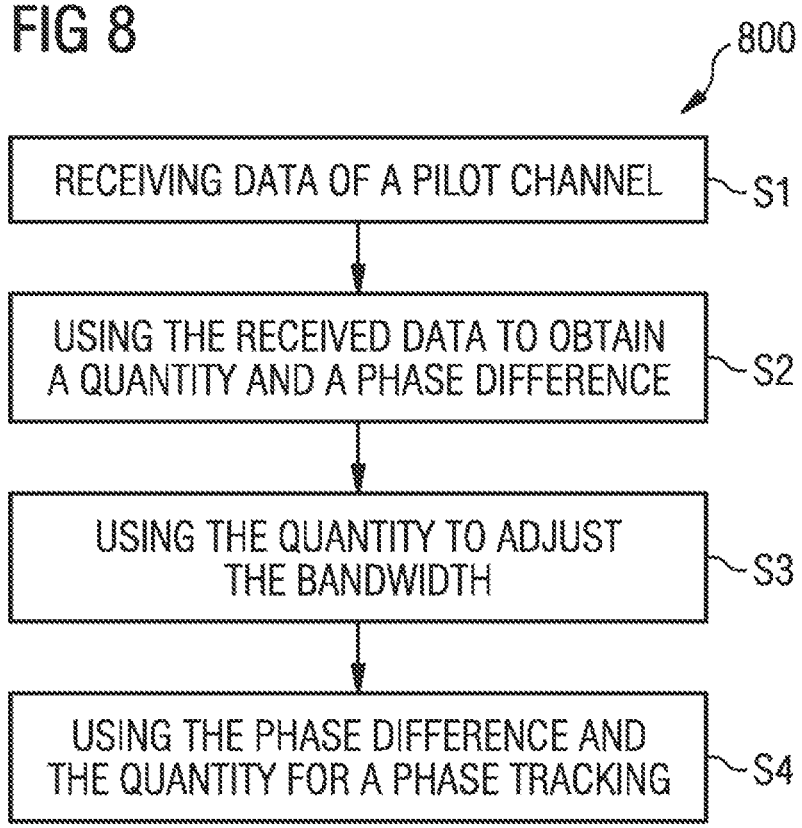

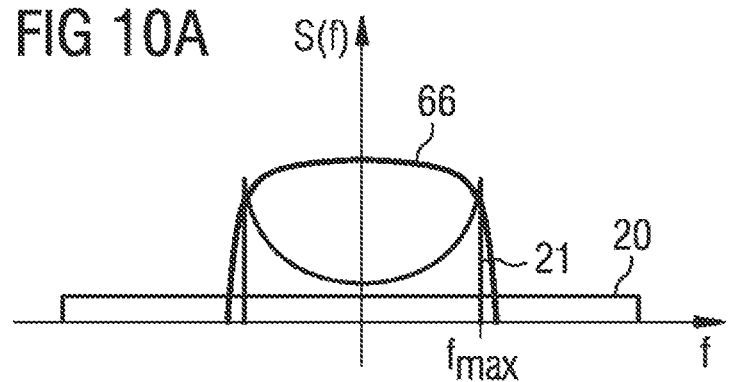
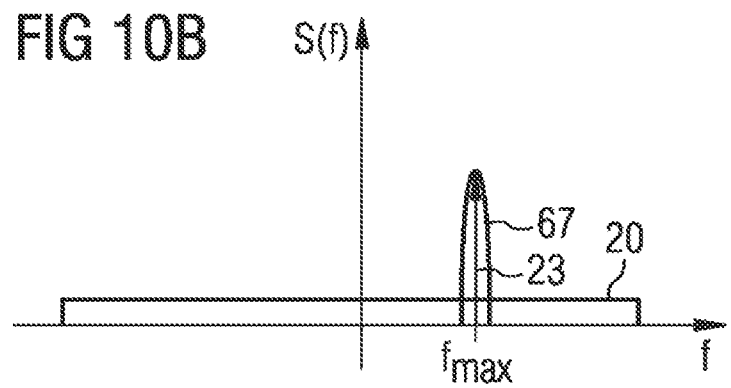

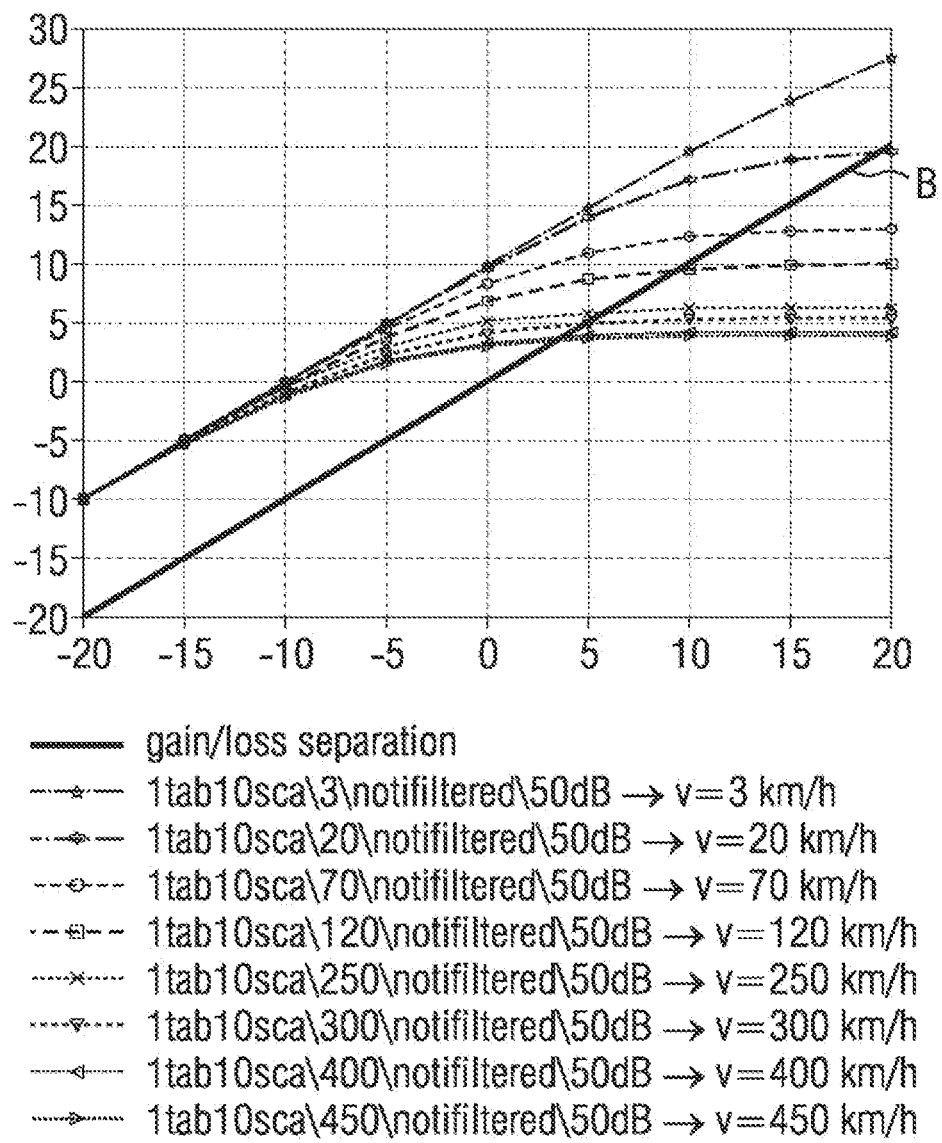

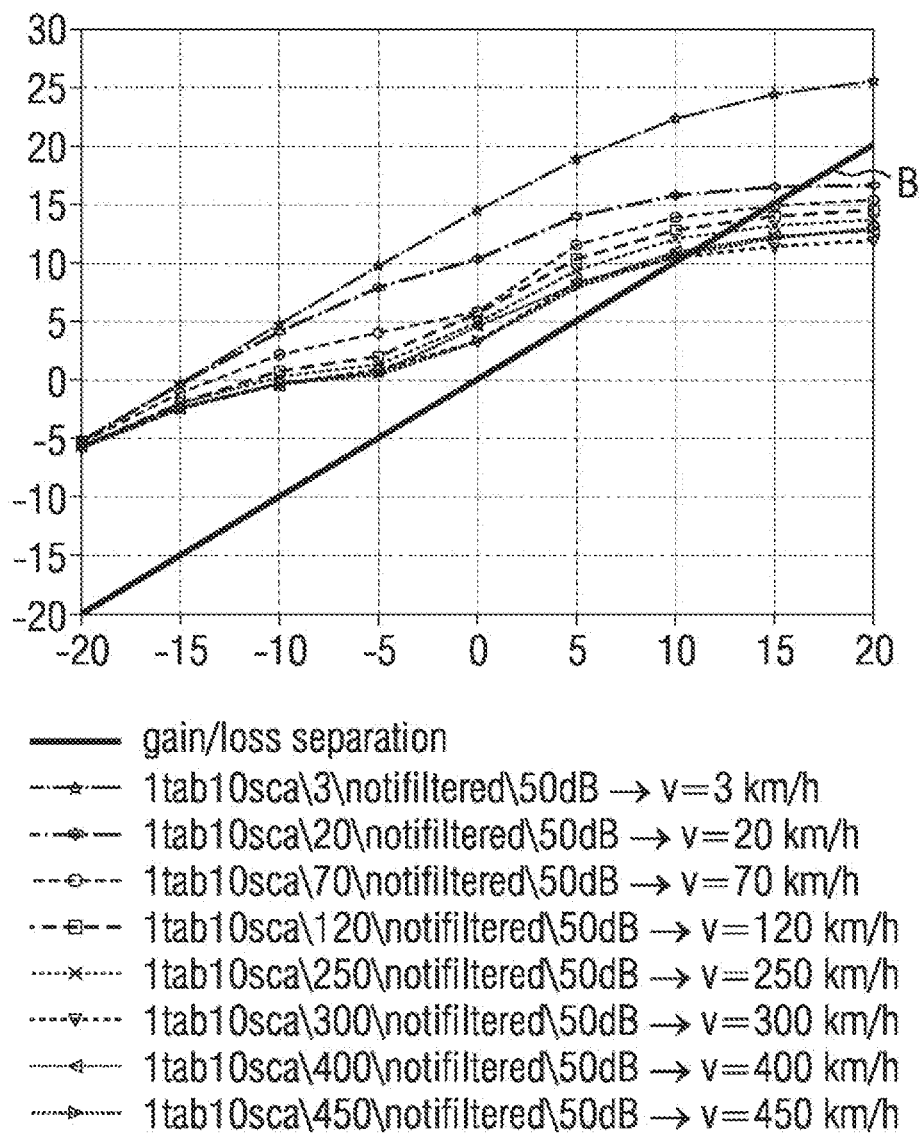

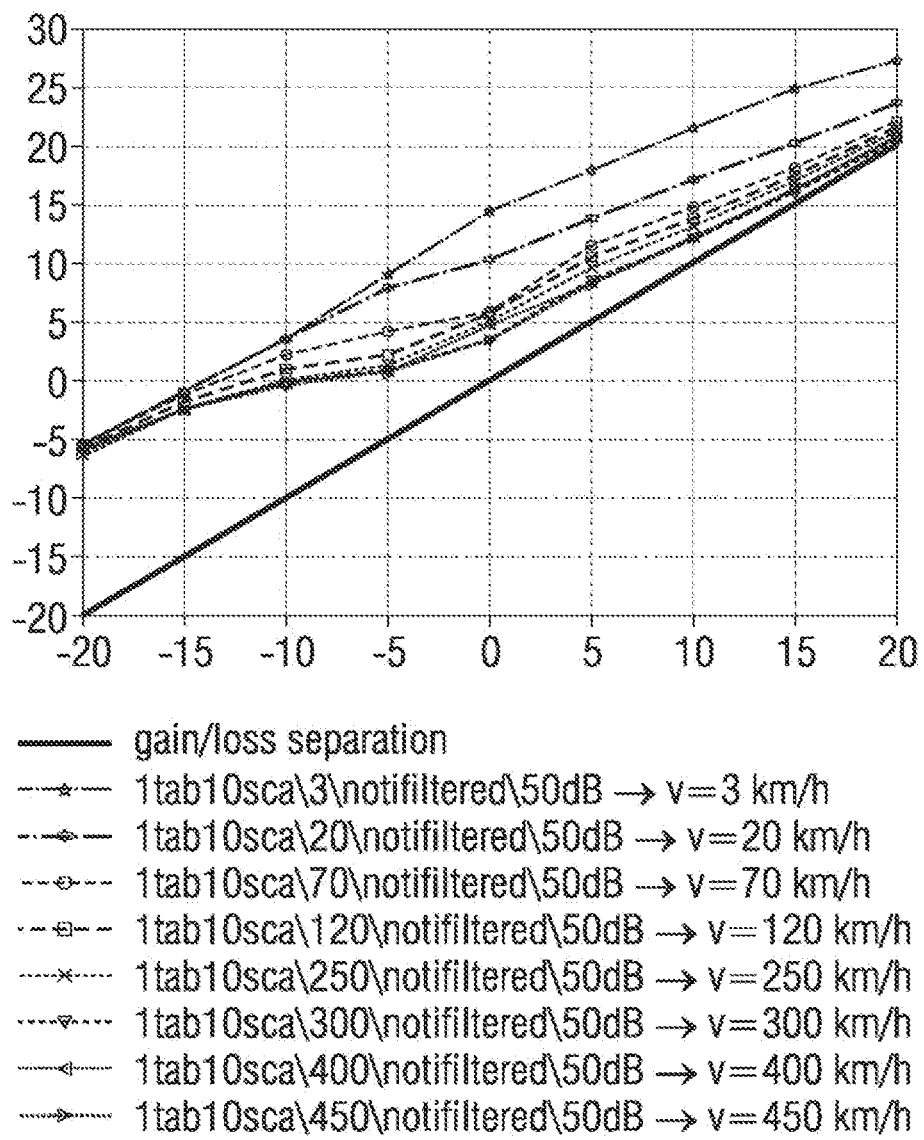

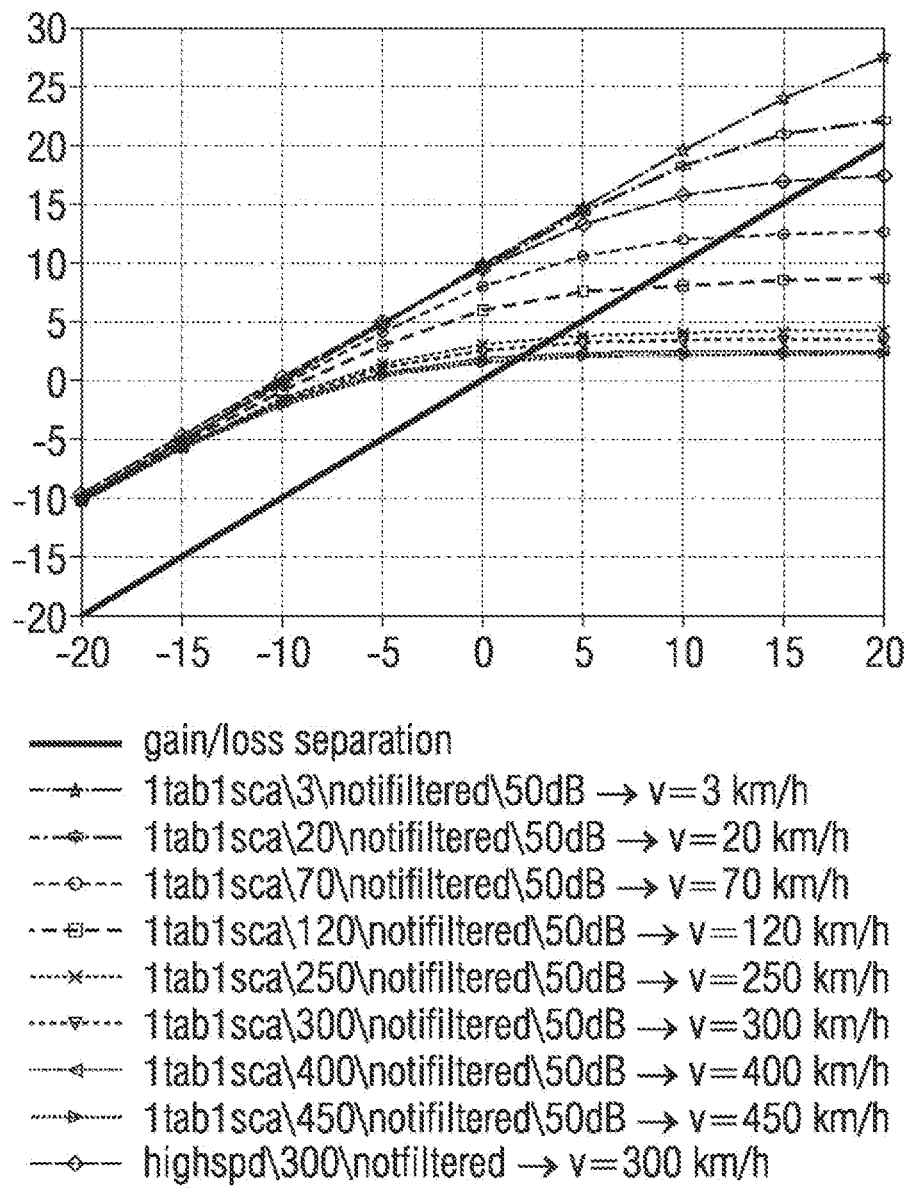

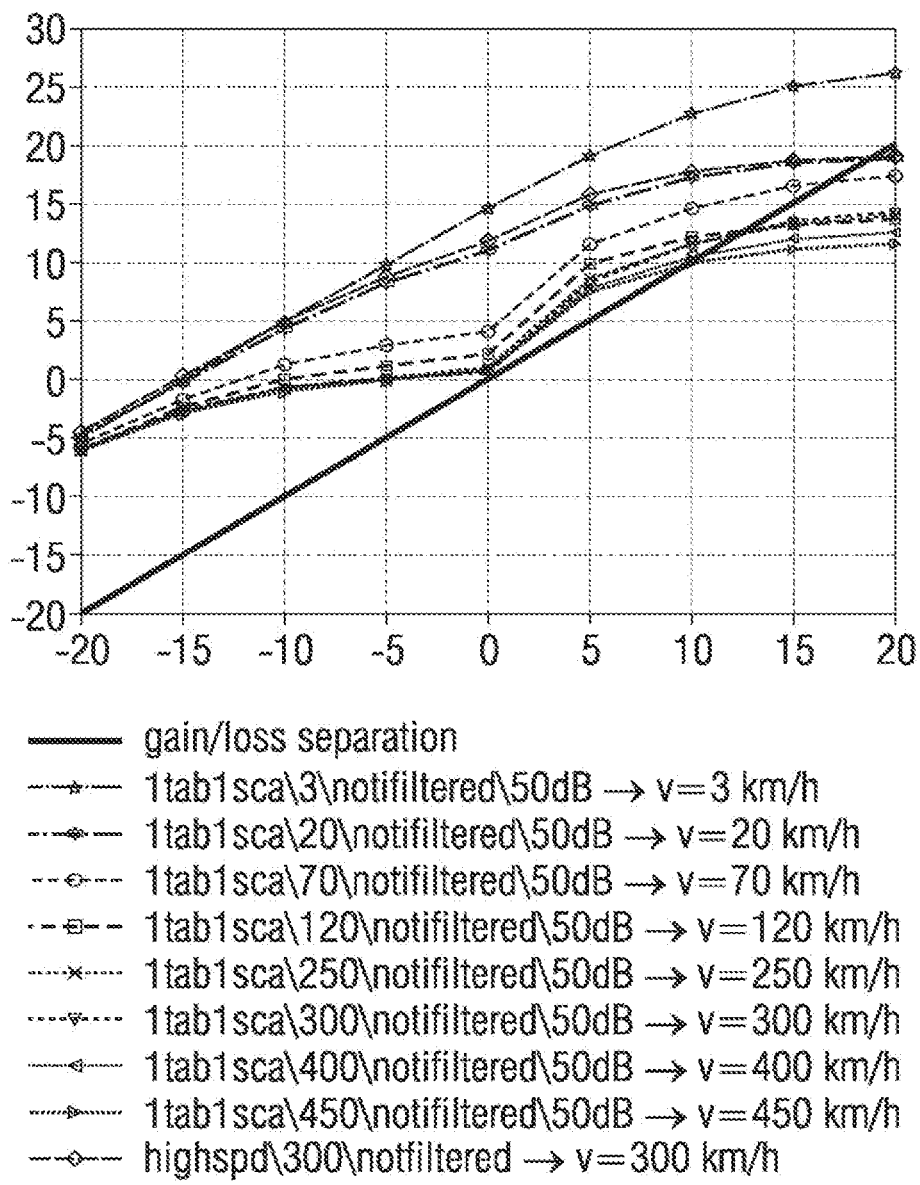

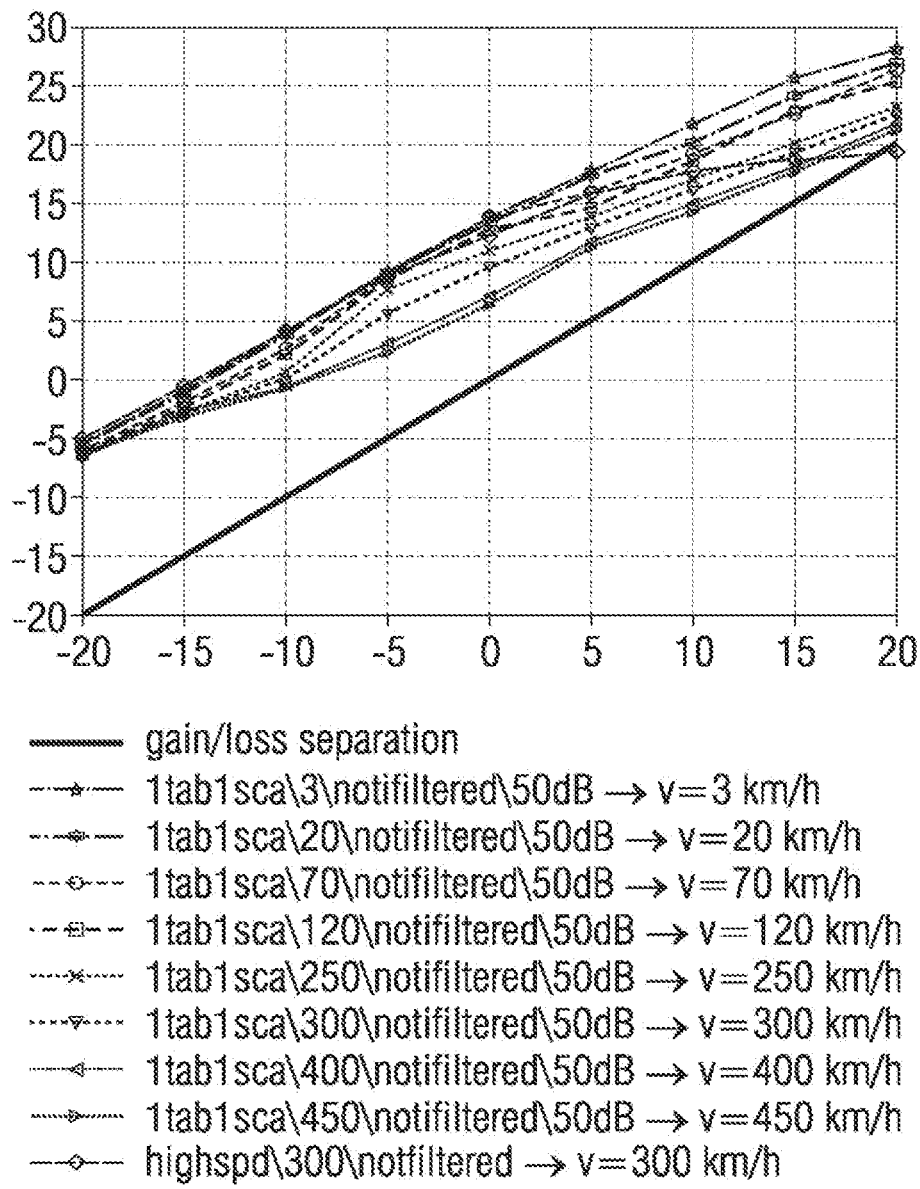

RECEIVER HAVING ADJUSTABLE CHANNEL ESTIMATION BANDWIDTH

FIELD

The invention relates to a receiver. More particularly, the invention relates to adjusting the bandwidth of a channel estimation unit comprised in a receiver and/or a phase tracking via the channel estimation unit.

BACKGROUND

In radio frequency communications systems transmitted signals may propagate from a transmitter to a receiver via different propagation paths. The transmitter and the receiver may move relative to each other during the signal transmission. Further, oscillators for carrier frequency up and down conversion comprised in the transmitter and/or receiver may deviate from a specified target value. This may result in a frequency broadening and/or a frequency shift of the transmission signals.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description.

FIG. 7 schematically illustrates a method 700 as an exemplary embodiment.

FIG. 8 schematically illustrates a method 800 as a further exemplary embodiment.

FIG. 10A schematically illustrates a noise spectrum, a broadened line spectrum and a passband of a filter.

FIG. 10B schematically illustrates a noise spectrum, a frequency shifted line spectrum and a passband of a filter.

FIG. 11A schematically illustrates a filter gain of a filter filtering frequency broadened signals.

FIG. 11B schematically illustrates a filter gain of a further filter filtering frequency broadened signals.

FIG. 11C schematically illustrates a filter gain of a further filter filtering frequency broadened signals.

FIG. 12A schematically illustrates a filter gain of a filter filtering a frequency shifted signal.

FIG. 12B schematically illustrates a filter gain of a further filter filtering a frequency shifted signal.

FIG. 12C schematically illustrates a filter gain of a further filter filtering a frequency shifted signal.

DETAILED DESCRIPTION

Figure 1:
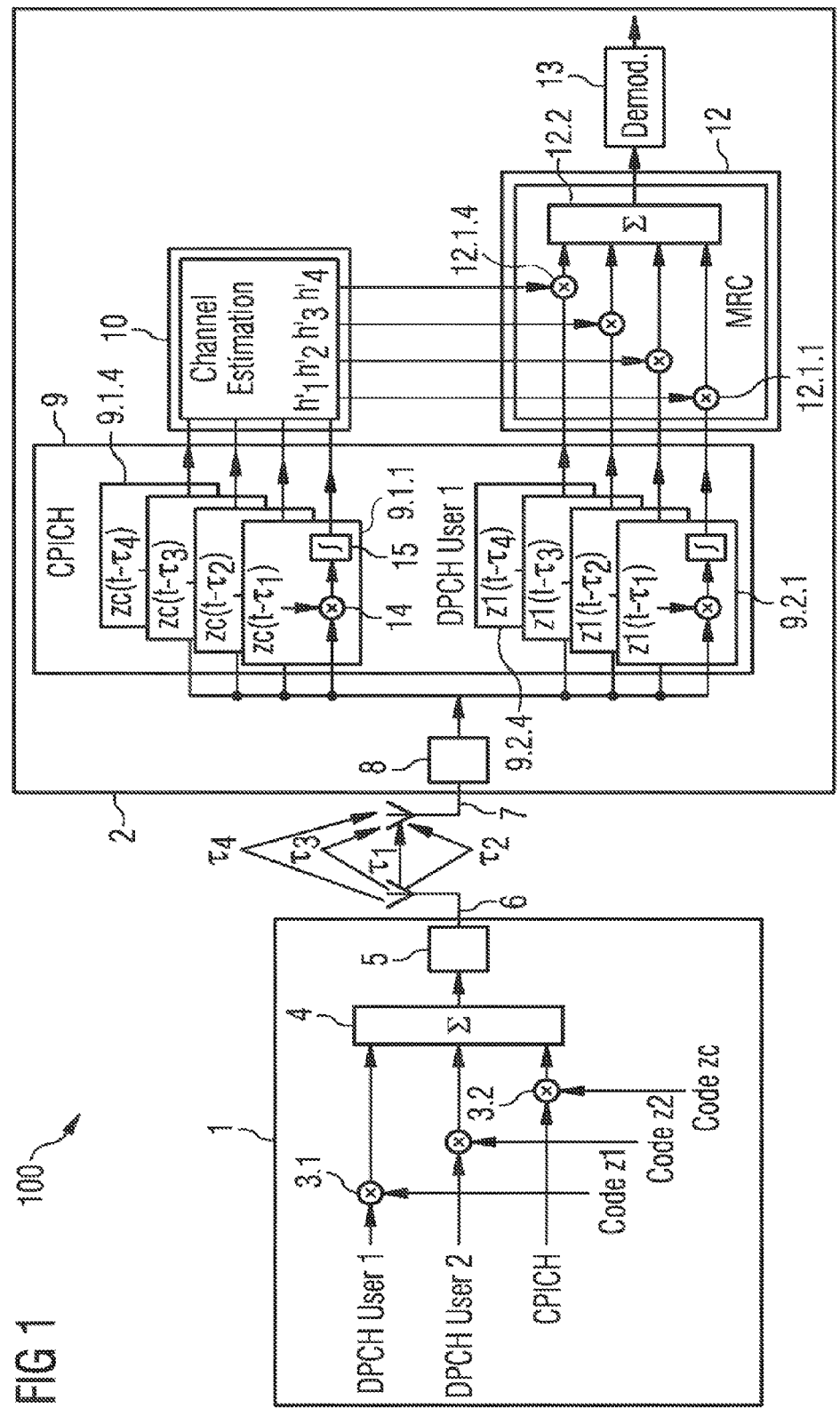
FIG. 1 schematically illustrates a radio frequency communications system 100.

In the following, embodiments are described with reference to the drawings, wherein like reference numerals are generally utilized to refer to like elements throughout. In the following description, for purposes of explanation, numerous specific details are set forth in order to provide a thorough understanding of one or more aspects of embodiments. However, it may be evident to a person skilled in the art that one or more aspects of the embodiments may be practiced with a lesser degree of these specific details. The following description is therefore not to be taken in a limiting sense, and the scope of protection is defined by the appended claims.

In addition, while a particular feature or aspect of an embodiment may be disclosed with respect to only one of several implementations, such feature or aspect may be combined with one or more other features or aspects of the other implementations as may be desired and advantageous for any given or particular application. Further, to the extent that the terms "include", "have", "with" or other variants thereof are used in either the detailed description or the claims, such terms are intended to be inclusive in a manner similar to the term "comprise". The terms "coupled" and "connected" along with derivatives may have been used. It should be understood that these terms may have been used to indicate that two elements co-operate or interact with each other regardless whether they are in direct physical or electrical contact or they are not in direct contact with each other. Further, it should be understood that embodiments of the invention may be implemented in discrete circuits, partially integrated circuits or fully integrated circuits or programming means. Also, the term "exemplary" is merely meant as an example, rather than the best or optimal.

The various aspects summarized may be embodied in various forms. The following description shows by way of illustration various combinations and configurations in which the aspects may be practiced. It is understood that the described aspects and/or embodiments are merely examples, and that other aspects and/or embodiments may be utilized and structural and functional modifications may be made, without departing from the scope of the present disclosure. The methods and devices described herein may be used for various wireless communication networks such as CDMA (Code Division Multiple Access), TDMA (Time Division Multiple Access), FDMA (Frequency Division Multiple Access), OFDMA (Orthogonal FDMA) and SC-FDMA (Single Carrier FDMA) networks. The terms "network" and "system" are often used interchangeably. A CDMA network may implement a radio technology such as Universal Terrestrial Radio Access (UTRA), cdma2000, etc. UTRA includes Wideband-CDMA (W-CDMA) and other CDMA variants. cdma2000 covers IS-2000, IS-95, and IS-856 standards. A TDMA network may implement a radio technology such as Global System for Mobile Communications (GSM) and derivatives thereof such as e.g. EDGE (Enhanced Data Rate for GSM Evolution), EGPRS (Enhanced General Packet Radio Service), etc. An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). UTRA, E-UTRA and GSM are described in documents from an organization named "3rd Generation Partnership Project" (3GPP).

In radio communications systems a transmitter transmitting one or more radio communications signals on one or more radio communications channels may be present. In particular, the transmitter may be a base station or a transmitting device included in a user's device, such as a mobile radio transceiver, a handheld radio device or any similar device. Radio communications signals transmitted by transmitters may be received by receivers such as a receiving device in a mobile radio transceiver, a handheld radio device or any similar device. In particular, radio communications systems as disclosed herein may include UMTS systems, which may conform to the 3GPP standard for UMTS systems. Radio communications signals as disclosed herein may be provided in UMTS systems, in particular over radio communications physical channels, such as primary common pilot channels, secondary common pilot channels, dedicated physical channels, dedicated physical control channels or similar channels according to the UMTS standard.

The following figures schematically illustrate devices and methods as exemplary embodiments. The illustration of the devices and methods is of qualitative nature and does not necessarily illustrate the explicit inner composition of the devices, for example their complete inner electronic configuration. Accordingly, the following figures do not necessarily show all components required for an actual operation of the illustrated devices.

FIG. 1 schematically illustrates a radio frequency communications system 100. The communications system 100 includes a transmitter 1 and a receiver 2 in form of a RAKE receiver. The transmitter 1 includes multipliers 3.1, 3.2, a combining unit 4, a conversion unit 5 and an antenna 6. The transmitter 1 may include further components which are not explicitly shown in FIG. 1 for the sake of simplicity. For example, the transmitter 1 may include encoders, interleaving units, scrambling units, Digital-Analog-Converters, digital filters, analog filters, amplifiers, mixers and/or local oscillators.

The receiver 2 includes an antenna 7, a conversion unit 8, a unit 9 including multiple RAKE fingers 9.1.1 to 9.1.N and 9.2.1 to 9.2.N, a channel estimation unit 10, a combining unit 12 in form of a Maximum Ratio Combiner (MRC) and a demodulation unit 13. Here, N corresponds to an arbitrary number. However, for the sake of simplicity N is chosen to have a value of four in FIG. 1. The channel estimation unit 10 may include N channel estimation filters 10.1 to 10.N (not explicitly shown), wherein each of these filters is connected to one of the RAKE fingers 9.1.1 to 9.1.N. For example, each of the channel estimation filters 10.1 to 10.N may be implemented according to the filter illustrated in FIG. 2. Each of the RAKE fingers 9.1.1 to 9.1.N and 9.2.1 to 9.2.N includes a multiplier 14 and an integration (or summation) unit 15. The combining unit 12 includes multipliers 12.1.1 to 12.1.N and a combiner 12.2. Similar to the transmitter 1, the receiver 2 may include further components which are not explicitly illustrated for the sake of simplicity. For example, the receiver 2 may further include decoders, deinterleaving units, descrambling units, demodulation units, Analog-Digital-Converters, digital filters, analog filters, amplifiers, mixers and/or local oscillators.

During an operation of the radio frequency communications system 100, transmission data is processed in the transmitter 1. FIG. 1 illustrates three exemplary signal paths. The first signal path including the multiplier 3.1 processes data of a first user that is to be transmitted via a physical channel, for example a dedicated physical channel (see DPCH User 1). A second signal path including multiplier 3.2 processes data that is to be transmitted via a pilot channel, for example a common pilot channel (see CPICH). The transmitter 1 may include further signal paths, for example signal paths for processing data of a further user that is to be transmitted via a further physical channel (see DPCH User 2). The multipliers 3.1 and 3.2 multiply the data that is to be transmitted via the physical channel and the pilot channel with a first spreading code (see z1) and a second spreading code (see zc), respectively. Of course, the data in the signal paths may be processed by further components that have been mentioned in foregoing paragraphs.

After processing the data in the described signal paths, the combining unit 4 combines the processed data to a signal which is forwarded to the conversion unit 5. The conversion unit 5 converts the signal from a baseband to a radio frequency signal which is transmitted by the antenna 6. Note that the transmitter 1 may utilize a plurality of antennas and needs not to be restricted to only one single antenna 6.

The radio frequency signals are transmitted over the air interface and propagate from the antenna 6 of the transmitter 1 to the antenna 7 of the receiver 2 via an arbitrary number N of propagation paths. Note again that the value of N is chosen to be four such that four exemplary propagation paths are indicated in FIG. 1 (see arrows). Each propagation path is associated with a variable $\tau$ indicating a time delay of the signal transmitted via this propagation path. For example, the difference $(\tau_4 - \tau_3)$ represents the time delay between the reception of the fourth signal at the antenna 7 and the reception of the third signal at the antenna 7. Similar to the transmitter 1, the receiver 2 may also utilize a plurality of antennas and is not restricted to only one single antenna 7.

The radio frequency signals received by the antenna 7 are converted to a baseband (or an intermediate band) by the conversion unit 8. The downconverted signal is then split into N signals processed by the RAKE fingers 9.1.1 to 9.1.N and N signals processed by the RAKE fingers 9.2.1 to 9.2.N. Here, the signal paths including the RAKE fingers 9.1.1 to 9.1.N are configured to process data received over the pilot channel while the signal paths including the RAKE fingers 9.2.1 to 9.2.N are configured to process data received over the physical channel.

Since a signal sent by the antenna 6 is transmitted via multiple propagation paths, the antenna 7 receives multiple images (or versions) of the transmitted signal with each signal image generally suffering from a different path delay (see different values for $\tau$). In the unit 9, each of the RAKE fingers 9.1.1 to 9.1.N is allocated to a particular one of the multipath propagation paths of the signal received at the antenna 7. That is, each of the RAKE fingers 9.1.1 to 9.1.N receives its own image (or version) of the originally transmitted signal. Note that each of the RAKE fingers 9.1.1 to 9.1.N can be time-aligned to process its input signal at an assigned path delay. For this purpose, each of the signal paths may contain delay elements (not shown) to delay the signals corresponding to the respective delays between the multiple propagation paths. The same holds true for the signal paths including the RAKE fingers 9.2.1 to 9.2.N.

The signals processed in the RAKE fingers 9.1.1 to 9.1.N are despread by the multipliers 14 and further processed by the integration units 15. It is understood that the RAKE fingers 9.1.1 to 9.1.N and 9.2.1 to 9.2.N may include further components which are not illustrated for the sake of simplicity. The despread signals processed in the RAKE fingers 9.1.1 to 9.1.N are forwarded to the channel estimation filters 10.1 to 10.N included in the channel estimation unit 10 such that each signal is processed by one of the filters. Each of the N channel estimation filters 10.1 to 10.N is associated with a channel weight $h_i$ (i=1, . . . , N) as described in the following.

A radio frequency signal transmitted via the i-th propagation path, received at the antenna 7 and despread by the i-th RAKE finger 9.1.$i$ ($i=1, \ldots, N$) may be written according to the formula $$y_i = h_i s + f_i + n_i = h_i s + e_i. \tag{1}$$

Here, $h_i$ denotes the channel weight associated with the transmitted signal, s denotes the transmitted signal, f denotes the interference and n denotes the noise. The interference f and the noise n may be combined to e (interference plus noise).

The filtered channel weights $h_i'$ are forwarded from the channel estimation units 10.1 to 10.N to the combining unit 12. In the combining unit 12 signals of the physical channel that have been processed in the RAKE fingers 9.2.1 to 9.2.N (similar to the described processing in the RAKE fingers 9.1.1 to 9.1.N) are multiplied by the channel weights $h_1'$ to $h_N'$ and combined by the combining unit 12.2. The combined signal is forwarded to the demodulation unit 13 and processed by possible further components (not shown) arranged downstream.

Figure 2:
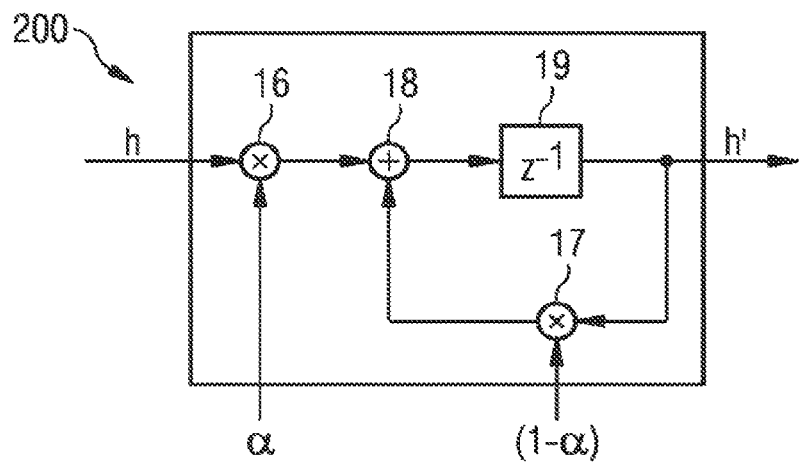
FIG. 2 schematically illustrates an IIR (Infinite Impulse Response) filter 200.

FIG. 2 schematically illustrates an IIR (Infinite Impulse Response) filter 200 which may be used as a channel estimation filter in the receiver 2 of FIG. 1 according to one embodiment. The filter 200 may be used for filtering the (yet unfiltered) channel coefficients $h_i$ as they may be output by the RAKE fingers 9.1.1 to 9.1.N. The filter 200 includes multipliers 16, 17, an adder 18 and a delay element 19. The multiplier 16 performs a multiplication of a signal with a factor $\alpha$, while the multiplier 17 performs a multiplication with a factor $(1-\alpha)$ in a feedback loop, wherein $0<\alpha\leq1$. The filter 200 receives a (yet unfiltered) coefficient h and performs a filtering according to the arrangement of FIG. 2. Here, the multiplication by $\alpha$ performed by the multiplier 16 and by $(1-\alpha)$ performed by the multiplier 17 corresponds to an adjustment of the bandwidth of the filter 200. A filtered coefficient h' is output at an output of the filter 200.

Figure 3A:
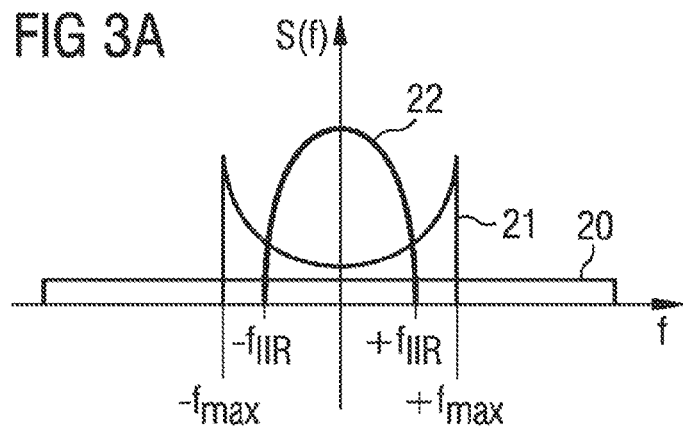
FIG. 3A schematically illustrates a noise spectrum, a broadened line spectrum and a passband of an IIR filter.

FIG. 3A schematically illustrates three graphs 20, 21 and 22 with the power density S being plotted against the frequency f. The graph 20 illustrates the noise/interference power. The graph 21 relates to a signal transmitted with a (carrier) frequency $f_0$ via a multipath channel from a transmitter to a receiver. That is, the signal received at the receiver includes multiple components, each of them transmitted via a different propagation path and being superimposed at the same time $\tau_i$. It is further assumed that the transmitter and the receiver move with a relative velocity of v. The multipath characteristic of the transmission and the relative motion of the transmitter and the receiver result in a broadening of the received signal spectrum due to the Doppler effect. In this case, the value of the frequency broadening coincides with the deviation of the Doppler spectrum. The signal spectrum may correspond to a Jakes spectrum having a maximum value of $$f_{max} = \frac{v}{c} \cdot f_0, \tag{2}$$

wherein c denotes the speed of light. The graph 22 illustrates the passband of an IIR filter, for example the filter 200 of FIG. 2. The filter associated with the graph 22 passes frequencies lying in an interval $[-f_{IIR}; +f_{IIR}]$ and attenuates frequencies outside of this frequency range. In FIG. 3A a static bandwidth of the filter is suboptimal because the filter attenuates significant parts of the received signal in most multipath channel scenarios. Moreover, the filter bandwidth determines the amount of noise and interference reduction. Hence, filter bandwidth is a trade-off parameter between reducing noise and interference and maximizing the power of the passed broadened transmit signal.

Figure 3B:
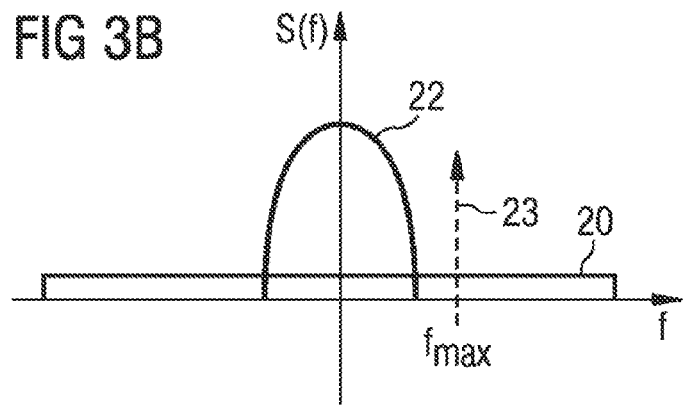
FIG. 3B schematically illustrates a noise spectrum, a frequency shifted line spectrum and a passband of an IIR filter.

FIG. 3B schematically illustrates three graphs 20, 22 and 23, wherein the graphs 20 and 22 have already been described in connection with FIG. 3A. The graph 23 relates to a signal which is transmitted with a (carrier) frequency $f_0$ via a single path channel from a transmitter to a receiver. Again, the transmitter and the receiver are assumed to move with a relative velocity of v. The single path character of the channel and the relative motion of the transmitter and the receiver result in a frequency shift of the (discrete) signal spectrum due to the Doppler effect. The frequency of the shifted signal corresponds to $f_{max}$ of equation (2). Similar to FIG. 3A, the bandwidth of the filter is suboptimal because the frequency of the received signal lies outside of the passband of the filter. That is, the received signal is attenuated. Note that the illustrated frequency shift may also be caused by a nonideal local oscillator of the transmitter outputting a frequency which differs or deviates from a desired carrier frequency. In this case, the value of the frequency shift coincides with the difference or deviation of the desired carrier frequency from the frequency actually output by the local oscillator. Note that the term "deviation" should be understood in a more general way and is meant to be suitable to describe a superposition of a broadened line spectrum and a shifted line spectrum. For both cases, the term "deviation" may refer to the difference with respect to the average frequency of the received signal spectrum.

Figure 4:
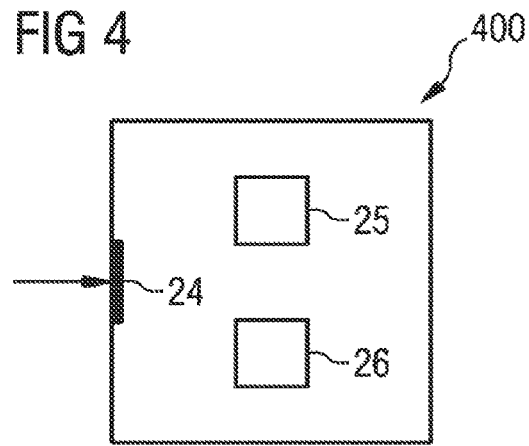
FIG. 4 schematically illustrates a receiver 400 as an exemplary embodiment.

FIG. 4 schematically illustrates a receiver 400 as an exemplary embodiment. The receiver 400 includes an input 24 to receive data of a pilot channel (see arrow) using a carrier frequency. The receiver 400 further includes a first unit 25 to obtain a quantity, wherein the quantity depends on a frequency broadening of the received data and a frequency shift of the received data with respect to the carrier frequency. Further, the receiver 400 includes a second unit 26 to adjust the bandwidth of a channel estimation unit (not shown), wherein the adjustment depends on the quantity.

FIG. 4 does not explicitly illustrate a detailed inner configuration of the receiver 400. Note that the units 25 and 26 do not necessarily correspond to single components but may also include an arbitrary number of single components. Further, no signal paths for processing the received data are illustrated in FIG. 4. This is because the data received at the input 24 is not necessarily forwarded to the first unit 25 directly. There may be further components arranged in the signal path(s) between the input 24 and the first unit 25. Similarly, the quantity obtained by the first unit 25 is not necessarily forwarded to the second unit 26 directly. Again, further components may be arranged in the signal path(s) between the first unit 25 and the second unit 26.

The adjustment of the channel estimation unit or filter (not shown) does not necessarily depend exclusively on the quantity obtained by the first unit 25. For example, there may be further components arranged between the second unit 26 and the channel estimation unit such that the adjustment of the bandwidth may depend on further quantities obtained by these additional components as well. Note further that the quantity obtained by the first unit 25 does not necessarily correspond to one single parameter or one single value which depends on a frequency broadening and a frequency shift of the received data at the same time. For example, the quantity may also include two separate parameters with the first parameter depending on a frequency broadening and the second parameter depending on a frequency shift.

Figure 9:
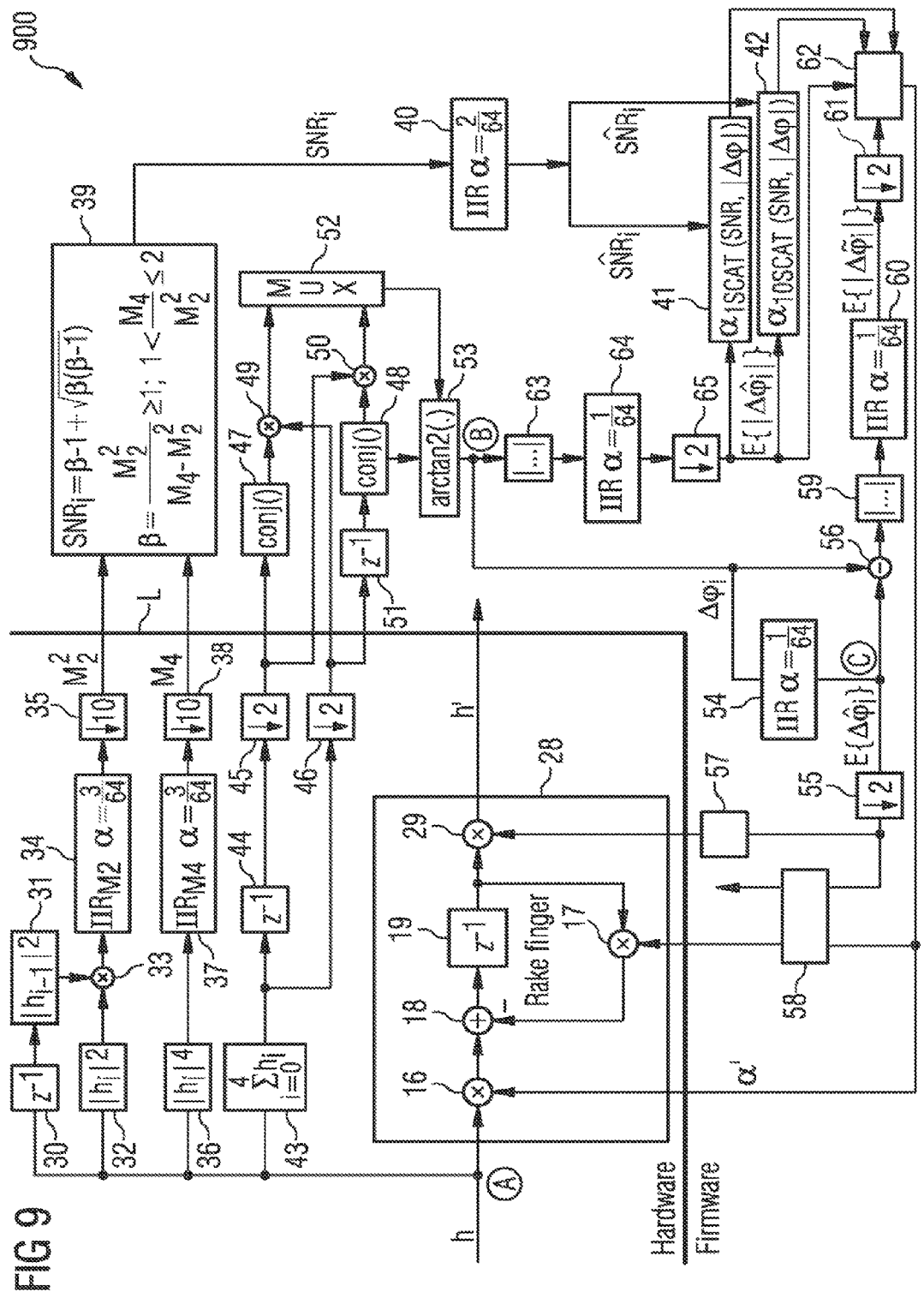
FIG. 9 schematically illustrates a receiver 900 as a further exemplary embodiment.

One difference between the receiver 400 and a receiver including the filter 200 of FIG. 2 is the adjustment of the bandwidth of the channel estimation filter. The adjustment of the filter 200 corresponds to a multiplication with a factor α (see multiplier 16 and 17 in FIG. 2), wherein $0 < \alpha \leq 1$. The factor α does not depend on a frequency broadening or a frequency shift of the received data. That is, the filter 200 does not account for frequency broadenings or frequency shifts (see FIGS. 3A and 3B) which may result in suboptimal filtering results described in foregoing paragraphs. In contrast to the filter 200, the receiver 400 provides an adjustment of a channel estimation unit using a quantity depending on frequency broadenings and frequency shifts of the received data. Due to taking these dependencies into account, the receiver 400 provides improved filtering results as it will become apparent from FIGS. 10A to 12C. A more detailed and exemplary embodiment of a receiver according to the receiver 400 is shown in FIG. 9.

Figure 5:
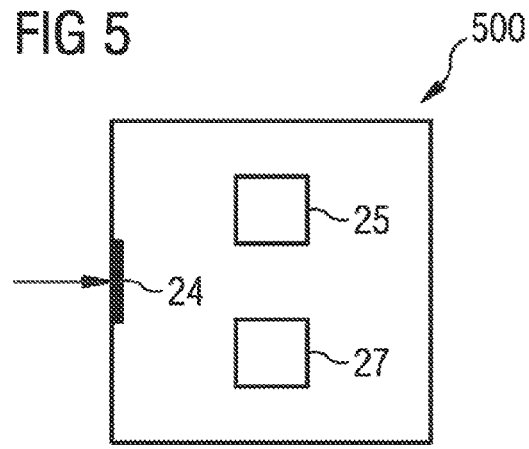
FIG. 5 schematically illustrates a receiver 500 as a further exemplary embodiment.

FIG. 5 schematically illustrates a receiver 500 as a further exemplary embodiment. The receiver 500 includes an input 24 to receive data of a pilot channel using a carrier frequency and a first unit 25 to obtain a quantity depending on a deviation of the frequency of the received data from the carrier frequency. Here, the term "deviation" may correspond to arbitrary differences between the frequency of the received data from the carrier frequency. For example, the frequency deviation may include a frequency broadening or a frequency shift. Note that the term "deviation" may, for example, be replaced by similar terms like "difference", "discrepancy", "divergence" or "variation". The receiver 500 further includes a third unit 27 to obtain a phase difference depending on a deviation of the frequency of the received data from the carrier frequency. The quantity is used to adjust the bandwidth of a channel estimation unit (not shown). Further, the phase difference and the quantity are used for a phase tracking of the received data.

In one particular embodiment, the receiver 500 may further include a fourth unit to detect a signal to noise ratio, wherein the adjustment of the bandwidth and/or the phase tracking is switched on if the signal to noise ratio is greater than a threshold value. For the case of a RAKE receiver, the threshold value may be chosen different for each one of the RAKE fingers. That is, for each one of the RAKE fingers bandwidth adjustment and/or phase tracking may be switched on or off according to the assigned individual threshold values which may have different values for bandwidth adjustment and phase tracking. For example, the threshold values may be set to a value of 0 dB measured at the input of the channel estimation filter per RAKE finger.

Statements made in connection with the receiver 400 of FIG. 4 may also hold true for the receiver 500 of FIG. 5 and vice versa. In particular, the quantity obtained by the first unit 25 of the receiver 500 may correspond to the quantity obtained by the first unit 25 of the receiver 400. Again, the detailed inner configuration of the receiver 500 is not given for reasons mentioned in connection with FIG. 4. Since the first unit 25 obtains a quantity depending on a deviation of the frequency of the received data from the carrier frequency which is used for adjusting the bandwidth of a channel estimation unit, the mentioned advantages of the receiver 400 may also exist for the receiver 500.

Referring back to FIG. 2, it becomes apparent that the IIR filter 200 does not provide a phase correction or a phase tracking. In contrast to this, the third unit 27 of the receiver 500 obtains a phase difference which (in combination with the quantity obtained by the first unit 25) is used for a phase tracking of the received data. Due to the adjustment of the filter's bandwidth and the phase tracking, thereby considering deviations of the frequency of the received data from the carrier frequency, the receiver 500 provides improved filtering results compared to the filter 200 as it will become apparent from FIGS. 10A to 12C.

Figure 6:
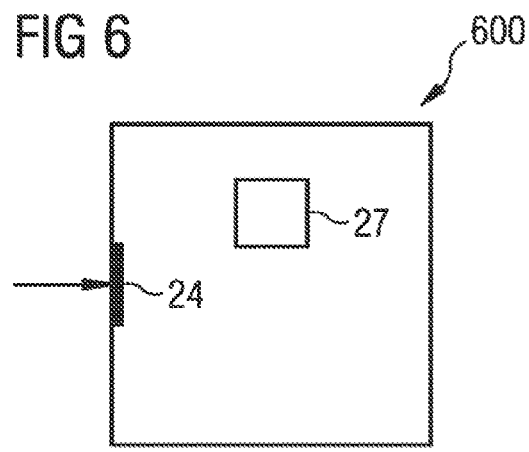
FIG. 6 schematically illustrates a receiver 600 as a further exemplary embodiment.

FIG. 6 schematically illustrates a receiver 600 as a further exemplary embodiment. The receiver 600 includes an input 24 to receive data of a pilot channel using a carrier frequency and a third unit 27 to obtain a phase difference depending on a deviation of the frequency of the received data from the carrier frequency. The receiver 600 further includes a feedback loop (not shown) in which the received data is phase tracked using the obtained phase difference.

Statements made in connection with the receivers 400 and 500 may also hold true for the receiver 600. In particular, the phase difference obtained by the third unit 27 of the receiver 500 may correspond to the phase difference obtained by the third unit 27 of the receiver 600. Again, a detailed description of the inner configuration of the receiver 600 is not given. Since the third unit 27 obtains a phase difference depending on a deviation of the frequency of the received data from the carrier frequency, the described advantages of the receiver 500 may also exist for the receiver 600.

Referring back to FIG. 2, it can be seen that the feedback loop of the filter 200 provides a multiplication by a real value (1−α). In contrast to this, the receiver 600 provides a feedback loop in which the received data is phase tracked using a complex phase. Due to this phase tracking, the receiver 600 provides improved filtering results as it will become apparent from FIGS. 10A to 12C.

FIG. 7 schematically illustrates a method 700 as an exemplary embodiment. The method 700 includes three steps S1 to S3 and may be read in connection with the receiver 400 according to one embodiment. In the first step S1, data of a pilot channel using a carrier frequency is received. In the second step S2, the received data is used to obtain a quantity, wherein the quantity depends on a frequency broadening of the received data and a frequency shift of the received data with respect to the carrier frequency. In the third step S3, the quantity is used to adjust the bandwidth of a channel estimation unit. A more detailed and exemplary method according to method 700 becomes apparent from FIG. 9 and its description.

FIG. 8 schematically illustrates a method 800 as a further exemplary embodiment. The method 800 includes four steps S1 to S4 and may be read in connection with the receiver 500 according to one embodiment. In the first step S1, data of a pilot channel using a carrier frequency is received. In the second step S2, the received data is used to obtain a quantity and a phase difference, both depending on a deviation of the frequency of the received data from the carrier frequency. In the third step S3, the quantity is used to adjust the bandwidth of a channel estimation unit. In the fourth step S4, the phase difference and the quantity are used for a phase tracking of the received data. A more detailed and exemplary method according to method 800 becomes apparent from FIG. 9 and its description.

FIG. 9 schematically illustrates a receiver 900 as a further exemplary embodiment. The receiver 900 includes multiple components that may be implemented in hardware or firmware. In one embodiment, the components are implemented according to FIG. 9, wherein the components arranged on the left or above a line L are implemented in hardware while the remaining components are implemented in firmware.

The receiver 900 includes a filter 28 having two multipliers 16, 17, an adder 18, a delay element 19 and a multiplier 29 which are arranged according to FIG. 9. The filter 28 further includes a multiplier 29 arranged downstream of a feedback loop including the multiplier 17. The filter 28 is configured to filter (yet unfiltered) channel weights h and output filtered channel weights h'. For example, the filter 28 may be used in the communications system 100 of FIG. 1.

At a point A of the receiver 900, received data of a pilot channel is split into four signals processed in four signal paths. The first signal path includes a delay element 30 and a calculation unit 31 to calculate the square of the absolute value $|h_{i-1}|^2$ of a delayed pilot channel symbol $h_{i-1}$. The second signal path includes a calculation unit 32 to calculate the square of the absolute value $|h_i|^2$ of a pilot channel symbol $h_i$ and a multiplier 33 to multiply the outputs of the calculating units 31 and 32. The second signal path further includes an IIR filter 34 having a bandwidth α of 3/64, for example, which may be embodied as an M2 filter outputting a value of $M_2^2$ and a unit 35 to decrease the sampling rate by a factor of 10. Note that the factor of 10 is exemplary and may change according to the design of the receiver 900. The third signal path includes a calculation unit 36 to calculate a value $|h_i|^4$ of a pilot channel symbol $h_i$, an IIR filter 37 having a bandwidth α of $$\frac{3}{64},$$

for example, which may be embodied as an M4 filter outputting a value of M4 and a unit 38 to decrease the sampling rate by a factor of 10. Concerning the M2 filter and the M4 filter, reference is made to "A comparison of SNR estimation techniques for the AWGM channel" by D. R. Pauluzzi and N. Beaulieu, IEEE TRANSACTIONS ON COMMUNICATIONS, VOL. 48, NO. 10. October 2000, which is hereby incorporated by reference in its entirety.

The outputs $M_2^2$ and $M_4$ of the units 35 and 38 are forwarded to a calculation unit 39 to calculate a signal to noise ratio $SNR_i$ according to the formula $$SNR_i = \beta - 1 + \sqrt{\beta(\beta-1)}, \quad (3)$$

wherein the value β is calculated according to the formula $$\beta = \frac{M_2^2}{M_4 - M_2^2} \geq 1 \quad (4)$$

with $$1 < \frac{M_4}{M_2^2} \leq 2. \quad (5)$$

The signal to noise ratio $SNR_i$ is forwarded to an IIR filter 40 having a bandwidth α of $$\frac{2}{64},$$

for example. The filter 40 outputs a filtered signal to noise ratio $S\hat{N}R_i$ which is forwarded to units 41, 42 whose functionality will be explained later.

The fourth signal path includes multiple components arranged in multiple signal branches as illustrated in FIG. 9. The fourth path includes a calculation unit 43 to calculate the sum $$\sum_{i=0}^{4} h_i$$

over five subsequent pilot channel symbols $h_i$, a delay element 44, two units 45, 46 to decrease the sampling rate by a factor of 2, two units 47, 48 to calculate the complex conjugates of their inputs, two multipliers 49, 50, a delay element 51 and a multiplexer 52. The multiplexer 52 receives signals output by the multipliers 49 and 50 and outputs a signal to a calculation unit 53. The signal output by the multiplexer 52 represents complex values and the calculation unit 53 is configured to calculate the value arctan2( ) (or a tan 2( )), wherein the first and second input value for the a tan 2( )-function correspond to the imaginary and real part of a complex value output by the multiplexer 52, respectively.

At a point B of the receiver 900, the calculation unit 53 outputs a phase difference $\Delta\phi_i$ which is further processed in two signal paths. A signal path includes an IIR filter 54 having a bandwidth α of $$\frac{1}{64},$$

for example, and outputting a value $E\{\Delta\hat{\phi}_i\}$ which is forwarded to a unit 55 to reduce the sampling rate by a factor of 2 and an adder 56 having a negative sign. The unit 55 outputs a signal to calculation units 57, 58 whose functionality will be explained later. The adder 56 subtracts the values output by the filter 54 and the calculation unit 53, the result being forwarded to a calculation unit 59 to calculate the absolute value of its input. Further, the following components are arranged downstream of the unit 59: an IIR filter 60 having a bandwidth α of $$\frac{1}{64},$$

for example, and outputting a value $E\{|\Delta\tilde{\phi}_i|\}$, a unit 61 to decrease the sampling rate by a factor of 2 and a calculation unit 62 whose functionality will be explained later.

Another signal path includes a calculation unit 63 to calculate the absolute value of its input, an IIR filter 64 having a bandwidth α of $$\frac{1}{64},$$

for example, and a unit 65 to decrease the sampling rate by a factor of 2. The output of the unit 65 is connected to the units 41 and 42.

The units 41 and 42 receive a first input $E\{|\Delta\hat{\phi}_i|\}$ from the unit 65 and a second input $S\hat{N}R_i$ from the filter 40. The unit 41 includes a first mapping to map a frequency shifted line spectrum and/or a signal to noise ratio to the bandwidth of a channel estimation unit receiving data having a frequency shifted line spectrum. Preferably, the unit 41 includes a first table having first coefficients $\alpha_{1SCAT}$ to characterize an optimal bandwidth of a channel estimation unit receiving data having a frequency shifted line spectrum. For example, the propagation of a signal via a transmission channel including one reflector may lead to a frequency shifted line spectrum. The first coefficients $\alpha_{1SCAT}$ may be obtained by simulating such a signal transmission and a reception of the transmitted signal at a channel estimation unit. Depending on the simulated received signal, the bandwidth of the channel estimation unit leading to an optimal filtering result is determined. The result of the simulation $\alpha_{1SCAT}$ thus represents the optimal bandwidth for a channel estimation filter receiving a signal having a frequency shifted line spectrum. It is understood that the result of the simulation may depend on what is actually considered as optimal value for the bandwidth of a channel estimation filter. For example, the bandwidth of the filter may be considered optimal if the passband of the filter fully includes the line of the shifted spectrum.

The unit 42 includes a second mapping to map a broadened line spectrum (being also referred to as broadened spectrum) and/or a signal to noise ratio to the bandwidth of a channel estimation unit receiving data having a broadened line spectrum. Preferably, the unit 42 includes a second table having second coefficients $\alpha_{10SCAT}$ to characterize an optimal bandwidth of a channel estimation unit receiving data having a broadened line spectrum, for example a Jakes spectrum. For example, the propagation of a signal via a transmission channel including an arbitrary number of reflectors (for example ten) may lead to a broadened line spectrum. The second coefficients $\alpha_{10SCAT}$ may be obtained by simulating such a signal transmission and a reception of the transmitted signal at a channel estimation unit. The optimal bandwidth is determined such that the result $\alpha_{10SCAT}$ of the simulation represents the optimal bandwidth for a channel estimation filter receiving a signal having a broadened line spectrum. It is understood that the result of the simulation may depend on what is actually considered an optimal value for the bandwidth of a channel estimation filter. For example, the bandwidth of the filter may be chosen such that the passband of the filter completely includes all frequencies of the broadened spectrum having a power density which is larger than the noise contribution.

The values $\alpha_{1SCAT}$ and $\alpha_{10SCAT}$ are forwarded to the calculation unit 62 which further receives the input value $E\{|\Delta\hat{\varphi}_i|\}$ from the unit 65. The calculation unit 62 calculates a quantity M according to the formula $$M = \text{MIN}\left(1; \left|1 - \frac{\{E|\Delta\hat{\varphi}_i - E(\Delta\hat{\varphi}_i)|\}}{E\{|\Delta\hat{\varphi}_i|\}}\right|\right) = \text{MIN}\left(1; \left|1 - \frac{E\{|\Delta\hat{\varphi}_i|\}}{E\{|\Delta\hat{\varphi}_i|\}}\right|\right), \quad (6)$$

wherein the function "MIN" represents the minimum value and the function "E" represents the expectation value (i.e. the average or mean value). Here, $0 \leq M \leq 1$.

Referring back to FIG. 1, in one embodiment, the value of the quantity M may be chosen to coincide for all RAKE fingers. That is, only one value for the quantity M is obtained and all RAKE fingers are assigned to the same value. In a further embodiment, at least two RAKE fingers may be assigned to different values of the quantity M. For example, a first RAKE finger may process signals sent by a first base station while a second RAKE finger may process signals sent by a second base station. It is understood that signals received from different base stations may suffer from different frequency broadenings or different frequency shifts. This fact may then be taken into account by obtaining a first value of the quantity M for the first RAKE finger and obtaining a second value of the quantity M for the second RAKE finger. In still a further embodiment, all RAKE fingers processing signals sent by a first base station may be assigned to a first value of the quantity M, while all RAKE fingers processing signals sent by a second base station may be assigned to a second value of the quantity M.

The calculation unit 62 calculates a value $\alpha'$ according to the formula $$\alpha' = M \cdot \alpha_{1SCAT} + (1-M) \cdot \alpha_{10SCAT}. \quad (7)$$

The value $\alpha'$ is forwarded to the multiplier 16 of the filter 28 to adjust the bandwidth of the filter 28.

For a better understanding, the calculation of $\alpha'$ is now explained by two exemplary cases. In the first case, the pilot signal is considered to have a frequency shifted line spectrum (see FIGS. 3B and 10B). Since this spectrum merely includes one peak, the values of $E\{|\Delta\hat{\varphi}_i|\}$ and $E\{\Delta\hat{\varphi}_i\}$ have equal magnitude (they may merely differ in the sign) such that $E\{|\Delta\hat{\varphi}_i - E\{\Delta\hat{\varphi}_i\}|\} = 0$ and M equals one (see equation (6)). Since $(1-M)$ is zero, $\alpha'$ equals $\alpha_{1SCAT}$ and includes no contribution from the $\alpha_{10SCAT}$ values. In the second case, the pilot signal is considered to have a broadened line spectrum (see FIGS. 3A and 10A). Since this spectrum is symmetrically distributed around zero, the mean value $E\{\Delta\hat{\varphi}_i\}$ equals zero leading to $E\{|\Delta\hat{\varphi}_i - E\{\Delta\hat{\varphi}_i\}|\} = E\{|\Delta\hat{\varphi}_i|\}$, whereas M equals zero. Thus, $\alpha'$ equals $\alpha_{10SCAT}$ and includes no contribution from the $\alpha_{1SCAT}$ values.

It is understood that transmitted signals may suffer from frequency shifts and frequency broadenings at the same time. For such cases, both weights M and $(1-M)$ do not equal to zero which leads to non-zero contributions of $\alpha_{1SCAT}$ and $\alpha_{10SCAT}$ to $\alpha'$. For example, the superposition of a Jakes-Doppler spectrum and a frequency shifted spectrum will result in a so-called Rice spectrum, whereas the quantity M will adapt the filter bandwidth accordingly. Here, the quantity M carries out a trade-off between the passband adaptation to the frequency broadened transmit signal via $\alpha_{10SCAT}$ and the phase tracking component of the frequency shifted transmit signal via $\alpha_{10SCAT}$. Moreover, as filter bandwidth adjustment is further used for noise and interference rejection, the quantity M implicitly depends on the signal to noise ratio via $\alpha_{1SCAT}$ and $\alpha_{10SCAT}$. However, the quantity M is not limited to certain types of Doppler spectra like Jakes spectra or Rice spectra, but is capable to generally distinguish broadened Doppler spectra and narrowband, i.e. line shifted spectra.

The value $\alpha'$ is forwarded to the calculation unit 58 which further receives the value $E\{\Delta\hat{\varphi}_i\}$ from the unit 55. The calculation unit 58 calculates a complex value S1 according to the formula $$S_1 = (1-\alpha') \cdot \exp\left(j \cdot \frac{E\{\Delta\hat{\varphi}_i\}}{10}\right), \quad (8)$$

wherein j is the imaginary unit. The value $S_1$ is forwarded to the multiplier 17 in the feedback loop of the filter 28 whereas the exponential term is used for a phase tracking and whereas the term $(1-\alpha')$ is part of the bandwidth control.

The unit 57 calculates a complex value S2 according to the formula $$S_2 = \exp\left(j \cdot \frac{E\{\Delta\hat{\varphi}_i\} \cdot \text{delay}}{10}\right), \quad (9)$$

wherein the value "delay" may be chosen to depend on the time required to obtain the value of $E\{\Delta\hat{\varphi}_i\}$ or other values calculated in the receiver 900. In one embodiment, the value "delay" corresponds to the time delay between the despread data symbols of the pilot channel and the despread data symbols of the physical channel. Such a delay compensation results in the physical channel data symbols being processed in the combining unit 25 using coherent or inphase pilot channel data symbols. The value S2 is forwarded to the multiplier 29 of the filter 28 for phase shifting the data output by the delay element 19.

Referring back to FIG. 4, the quantity obtained by the first unit 25 of the receiver 400 and depending on a frequency shift and a frequency broadening of the received pilot channel data may, for example, be identified with the quantity M of formula (6). The value M depends on the value $E\{\Delta\hat{\phi}_i\}$ which is output by the filter 54 and depends on a frequency shift and a frequency broadening of the received pilot channel data. Accordingly, the first unit 25 of FIG. 4 may be identified with one or more components of the receiver 900 used for the calculation of the value $E\{|\Delta\hat{\phi}_i|\}$. Note however that the quantity obtained by the first unit 25 of FIG. 4 may also be identified with the value $\Delta\phi_i=\hat{\Delta}\phi_i$ obtained at the point B of the receiver 900 or the value α' output by the calculation unit 62 since these values depend on a frequency shift and a frequency broadening of the received pilot channel data as well. The second unit 26 of FIG. 4 may be identified with the multiplier 16 and 17 which is used to adjust the bandwidth of the filter 28 by multiplying the received data with the factor α'. Similar to the receiver 400 of FIG. 4, the receiver 900 provides improved filtering results in comparison to the filter 200 of FIG. 2 as it will become apparent from FIGS. 10A to 12C.

Referring back to FIG. 5, the quantity obtained by the first unit 25 of the receiver 500 and depending on a deviation of the frequency of the received data from the carrier frequency may, for example, be identified with the quantity α'. This is because a' depends on said deviation and is used to adjust the bandwidth of the filter 28. The phase difference obtained by the third unit 27 of FIG. 5 may, for example, be identified with the value $E\{\Delta\hat{\phi}_i\}$. This value is used for the phase tracking in the feedback loop of the filter 28 by feeding S1 according to formula (8) into the multiplier 17. The foregoing comments may be adapted to the respective components of the receiver 600 of FIG. 6.

FIG. 10A schematically illustrates three graphs 20, 21 and 66 with the power density S being plotted against the frequency f. The graphs 20 and 21 have already been described in connection with FIG. 3A. The graph 66 illustrates the passband of a filter similar to the filters 400, 500, 600 and 900. Since the filter passes nearly all frequencies included in the transmitted signal, the bandwidth of the filter may be considered optimal. No significant parts of the received signal are attenuated. Referring to formulas (6) and (7), the value of M equals zero because the curve 66 is symmetrically distributed around zero. Further, α' equals $\alpha_{1OSCAT}$. A comparison of FIGS. 3A and 10A shows that the filters 400, 500, 600 and 900 provide improved filtering results compared to the filter 200 of FIG. 2.

FIG. 10B schematically illustrates three graphs 20, 23 and 67, wherein the graphs 20 and 23 have already been described in connection with FIG. 3B. The graph 67 illustrates the passband of a filter similar to the filters 400, 500, 600 and 900. Since the filter passes the only frequency included in the spectrum of the received signal, the bandwidth of the filter may be considered optimal. Again, no significant parts of the received signal are attenuated. Referring to formulas (6) and (7), the value of M equals one because the spectrum 23 only includes one frequency. Accordingly, α' equals $\alpha_{1SCAT}$. A comparison of FIG. 3B and FIG. 10B shows that the filters 400, 500, 600 and 900 provide improved filtering results compared to the filter 200 of FIG. 2.

FIG. 11A schematically illustrates the filter gain of a filter with the negative normalized mean square error (NMSE) of the channel estimation filter outputs in the logarithmic domain being plotted against the input SNR at the input of the channel estimation filter of the received signal. A bisecting line B indicates a gain-loss separation of the illustrated graphs. That is, for the case of a graph lying above the bisecting line B, the filter shows a gain, otherwise a loss. The multiple graphs of FIG. 11A illustrate the filter gains of a filter similar to the filter 200 of FIG. 2 which filters signals having a broadened line spectrum. Each of these graphs is assigned to a relative velocity between the transmitter and the receiver. The most upper graph of FIG. 11A relates to a relative velocity of 3 km/h and the lowest graph relates to a relative velocity of 450 km/h. From FIG. 11A it becomes apparent that high velocities in combination with high values of the SNR lead to a filter loss (see associated parts of the graphs lying beneath the bisecting line B). For these cases, the filter gain may be considered suboptimal.

FIG. 11B schematically illustrates the filter gain of a filter whose bandwidth is controlled according to the receivers 400, 500, 600 and 900. Compared to FIG. 11B the filter gain is generally improved because the graphs are shifted upwards such that the amount of graphs lying beneath the bisecting line B is decreased.

FIG. 11C schematically illustrates the filter gain of a filter whose bandwidth is controlled according to filters 400, 500, 600 and 900. Further, a phase tracking is performed according to said filters. Compared to FIGS. 11A and 11B the filter gain is improved because in FIG. 11C all graphs completely proceed over the bisecting line B.

FIGS. 12A to 12C differ from FIGS. 11A to 11C concerning the considered received signal. While in FIGS. 11A to 11C the received signal was assumed to have a broadened line spectrum, FIGS. 12A to 12C relate to a received signal having a frequency shifted line spectrum. Similar to FIGS. 11A to 11C it becomes apparent that phase tracking and controlling the bandwidth according to the filters 400, 500, 600 and 900 results in improved filter results.

Although specific embodiments have been illustrated and described herein, it will be appreciated by those of ordinary skill in the art that a variety of alternate and/or equivalent implementations may be substituted for the specific embodiments shown and described without departing from the scope of the present invention. For instance, implementations described in the context of a UMTS receiver could be applied to CDMA receivers or to mobile communication receivers relating to other technical standards such as e.g. GSM or derivatives thereof or applying other multiple access schemes such as e.g. TDMA, FDMA etc. This application is intended to cover any adaptations or variations of the specific embodiments discussed herein. Therefore, it is intended that this invention be limited only by the claims and the equivalents thereof.

What is claimed is:

1. A receiver, comprising:
   an input configured to receive data of a pilot channel having a carrier frequency associated therewith;
   a first unit configured to obtain a quantity, wherein the quantity depends on a frequency broadening of the received data and a frequency shift of the received data with respect to the carrier frequency;
   a second unit configured to adjust the bandwidth of a channel estimation unit, wherein the adjustment depends on the quantity;

a third unit configured to obtain a phase difference depending on a deviation of the frequency of the received data from the carrier frequency; and
a filter comprising a feedback loop in which the received data is phase tracked, wherein the phase tracking depends on the quantity and the phase difference.

2. The receiver of claim 1, further comprising:
a fifth unit to phase shift the received data, wherein the fifth unit is arranged downstream of the feedback loop and the phase of the phase shift depends on a time duration expended to obtain the quantity or the phase difference, or both the time duration expended to obtain the quantity and the phase difference.

3. The receiver of claim 1, further comprising:
an output configured to output channel coefficients used for processing data of a physical channel.

4. The receiver of claim 1, further comprising:
a fourth unit configured to detect a signal to noise ratio, wherein the adjustment of the bandwidth depending on the quantity or the phase tracking, or both the quantity and the phase tracking, is switched on if the signal to noise ratio is greater than a threshold value.

5. A receiver, comprising:
an input configured to receive data of a pilot channel having a carrier frequency associated therewith;
a first unit configured to obtain a quantity, wherein the quantity depends on a frequency broadening of the received data and a frequency shift of the received data with respect to the carrier frequency;
a second unit configured to adjust the bandwidth of a channel estimation unit, wherein the adjustment depends on the quantity;
a first mapping unit configured to map a frequency shifted line spectrum to the bandwidth of the channel estimation unit receiving data having a frequency shifted line spectrum, or configured to map a signal to noise ratio to the bandwidth of the channel estimation unit receiving data having a frequency shifted line spectrum, or configured to map both the frequency shifted line spectrum and the signal to noise ratio to the bandwidth of the channel estimation unit receiving data having a frequency shifted line spectrum; and
a second mapping unit configured to map a broadened line spectrum to the bandwidth of the channel estimation unit receiving data having a broadened line spectrum, or configured to map a signal to noise ratio to the bandwidth of the channel estimation unit receiving data having a broadened line spectrum, or configured to map both the broadened line spectrum and the signal to noise ratio to the bandwidth of the channel estimation unit receiving data having the broadened line spectrum.

6. The receiver of claim 5, wherein:
the first mapping unit comprises a first table comprising at least one first coefficient to characterize an optimal bandwidth of the channel estimation unit receiving data having a frequency shifted line spectrum; and
the second mapping unit comprises a second table comprising at least one second coefficient to characterize an optimal bandwidth of the channel estimation unit receiving data having a broadened line spectrum.

7. The receiver of claim 6, further comprising:
a fourth unit configured to detect a signal to noise ratio of the received data.

8. The receiver of claim 7, further comprising:
a third unit to obtain a phase difference depending on a deviation of the frequency of the received data from the carrier frequency, wherein the signal to noise ratio and the phase difference are used to choose a first coefficient from the first table and a second coefficient from the second table.

9. The receiver of claim 8, wherein the adjustment of the bandwidth of the channel estimation unit depends on a function to calculate a filter coefficient, the function depending on the quantity, the first coefficient and the second coefficient.

10. A receiver, comprising:
an input configured to receive data of a pilot channel having a carrier frequency associated therewith;
a first unit configured to obtain a quantity, wherein the quantity depends on a frequency broadening of the received data and a frequency shift of the received data with respect to the carrier frequency; and
a second unit configured to adjust the bandwidth of a channel estimation unit, wherein the adjustment depends on the quantity,
wherein the receiver comprises a RAKE receiver comprising multiple RAKE fingers, wherein all RAKE fingers are assigned to exactly one value of the quantity or at least two RAKE fingers are assigned to different values of the quantity.

11. A receiver, comprising:
an input configured to receive data of a pilot channel having a carrier frequency associated therewith;
a first unit configured to obtain a quantity depending on a deviation of the frequency of the received data from the carrier frequency;
a third unit configured to obtain a phase difference depending on a deviation of the frequency of the received data from the carrier frequency, wherein the quantity is used to adjust the bandwidth of a channel estimation unit and wherein the phase difference and the quantity are used for a phase tracking of the received data; and
a filter comprising a feedback loop in which the phase tracking is performed using the quantity and the phase difference.

12. A receiver, comprising:
an input configured to receive data of a pilot channel having a carrier frequency associated therewith;
a first unit configured to obtain a quantity depending on a deviation of the frequency of the received data from the carrier frequency;
a third unit configured to obtain a phase difference depending on a deviation of the frequency of the received data from the carrier frequency, wherein the quantity is used to adjust the bandwidth of a channel estimation unit and wherein the phase difference and the quantity are used for a phase tracking of the received data;
a first mapping unit configured to map a frequency shifted line spectrum to the bandwidth of the channel estimation unit receiving data having a frequency shifted line spectrum, or configured to map a signal to noise ratio to the bandwidth of the channel estimation unit receiving data having a frequency shifted line spectrum, or configured to map both the frequency shifted line spectrum and the signal to noise ratio to the bandwidth of the channel estimation unit receiving data having a frequency shifted line spectrum; and
a second mapping unit configured to map a broadened line spectrum to the bandwidth of the channel estimation unit receiving data having a broadened line spectrum, or configured to map a signal to noise ratio to the bandwidth of the channel estimation unit receiving data having a broadened line spectrum, or configured to map both the broadened line spectrum and the signal to noise ratio to the bandwidth of the channel estimation unit receiving data having the broadened line spectrum.

13. The receiver of claim 12, wherein:
the first mapping unit comprises a first table comprising at least one first coefficient to characterize an optimal bandwidth of the channel estimation unit receiving data having a frequency shifted line spectrum; and
the second mapping unit comprises a second table comprising at least one second coefficient to characterize an optimal bandwidth of the channel estimation unit receiving data having a broadened line spectrum.

14. The receiver of claim 13, further comprising:
a fourth unit configured to detect a signal to noise ratio of the received data.

15. The receiver of claim 14, wherein the signal to noise ratio and the phase difference are used to choose a first coefficient from the first table and a second coefficient from the second table.

16. A receiver, comprising:
an input configured to receive data of a pilot channel having a carrier frequency associated therewith;
a third unit configured to obtain a phase difference depending on a deviation of the frequency of the received data from the carrier frequency; and
a filter comprising a feedback loop in which the received data is phase tracked using the obtained phase difference.

17. The receiver of claim 16, further comprising:
a first unit configured to obtain a quantity, wherein the quantity depends on a frequency broadening of the received data and a frequency shift of the received data with respect to the carrier frequency; and
a second unit configured to adjust the bandwidth of a channel estimation unit, wherein the adjustment depends on the quantity.

18. The receiver of claim 16, further comprising:
a first mapping unit configured to map a frequency shifted line spectrum to the bandwidth of the channel estimation unit receiving data having a frequency shifted line spectrum, or configured to map a signal to noise ratio to the bandwidth of the channel estimation unit receiving data having a frequency shifted line spectrum, or configured to map both the frequency shifted line spectrum and the signal to noise ratio to the bandwidth of the channel estimation unit receiving data having a frequency shifted line spectrum; and
a second mapping unit configured to map a broadened line spectrum, to the bandwidth of the channel estimation unit receiving data having a broadened line spectrum, or configured to map a signal to noise ratio to the bandwidth of the channel estimation unit receiving data having a broadened line spectrum, or configured to map both the broadened line spectrum and the signal to noise ratio to the bandwidth of the channel estimation unit receiving data having the broadened line spectrum.

19. The receiver of claim 18, wherein:
the first mapping unit comprises a first table comprising at least one first coefficient to characterize an optimal bandwidth of the channel estimation unit receiving data having a frequency shifted line spectrum; and
the second mapping unit comprises a second table comprising at least one second coefficient to characterize an optimal bandwidth of the channel estimation unit receiving data having a broadened line spectrum.

20. The receiver of claim 19, further comprising:
a fourth unit configured to detect a signal to noise ratio, wherein the signal to noise ratio and the phase difference are used to choose a first coefficient from the first table and a second coefficient from the second table.

21. A method, comprising:
receiving data of a pilot channel having a carrier frequency associated therewith;
using the received data to obtain a quantity, wherein the quantity depends on a frequency broadening of the received data and a frequency shift of the received data with respect to the carrier frequency;
using the quantity to adjust the bandwidth of a channel estimation unit; and
using a feedback loop in a filter to phase track the received data, wherein the phase tracking depends on the quantity.

22. A receiver, comprising:
an input configured to receive data of a pilot channel having a carrier frequency associated therewith;
a first unit configured to obtain a quantity in a time domain, wherein the quantity depends on a frequency broadening of the received data and a frequency shift of the received data with respect to the carrier frequency; and
a second unit configured to adjust the bandwidth of a channel estimation unit, wherein the adjustment depends on the quantity.

23. A receiver, comprising:
an input configured to receive data of a pilot channel having a carrier frequency associated therewith;
a first unit configured to obtain a quantity, wherein the quantity depends on a frequency broadening of the received data and a frequency shift of the received data with respect to the carrier frequency;
a second unit configured to adjust the bandwidth of a channel estimation unit, wherein the adjustment depends on the quantity; and
a filter comprising a feedback loop in which the received data is phase tracked, wherein the phase tracking depends on the quantity.

24. A receiver, comprising:
an input configured to receive data of a pilot channel having a carrier frequency associated therewith;
a first unit configured to obtain a quantity, wherein the quantity depends on a frequency broadening of the received data and a frequency shift of the received data with respect to the carrier frequency; and
a second unit configured to adjust the bandwidth of a channel estimation unit, wherein the adjustment depends on the quantity; and
a second mapping unit configured to map at least one of a broadened line spectrum and a signal to noise ratio to the bandwidth of the channel estimation unit receiving data having a broadened line spectrum.

* * * * *